(12) United States Patent
Papakostas et al.

(10) Patent No.: US 11,127,044 B2
(45) Date of Patent: Sep. 21, 2021

(54) METHODS AND APPARATUS TO EXPAND PANELIST ENROLLMENT

(71) Applicant: The Nielsen Company (US), LLC, New York, NY (US)

(72) Inventors: Achilleas Papakostas, Dallas, TX (US); Susan Cimino, Odessa, FL (US)

(73) Assignee: The Nielsen Company (US), LLC, New York, NY (US)

(\*) Notice: Subject to any disclaimer, the term of this patent is extended or adjusted under 35 U.S.C. 154(b) by 717 days.

(21) Appl. No.: 15/388,562

(22) Filed: Dec. 22, 2016

(65) Prior Publication Data

US 2018/0181994 A1    Jun. 28, 2018

(51) Int. Cl.

| | |
|---|---|
| *G06Q 30/02* | (2012.01) |
| *H04N 21/258* | (2011.01) |
| *H04L 29/08* | (2006.01) |
| *H04L 29/06* | (2006.01) |
| *H04N 21/442* | (2011.01) |
| *H04W 84/12* | (2009.01) |

(52) U.S. Cl.
CPC ..... *G06Q 30/0269* (2013.01); *G06Q 30/0201* (2013.01); *H04L 63/0876* (2013.01); *H04L 67/22* (2013.01); *H04N 21/258* (2013.01); *H04N 21/44213* (2013.01); *H04N 21/44227* (2013.01); *H04W 84/12* (2013.01)

(58) Field of Classification Search
CPC ....... H04N 21/44213; H04N 21/25883; G06Q 30/0201; G06Q 30/02; G06K 9/00744
USPC ......................................................... 705/7.29
See application file for complete search history.

(56) References Cited

U.S. PATENT DOCUMENTS

| | | |
|---|---|---|
| 6,917,972 B1 | 7/2005 | Basko et al. |
| 7,930,285 B2 | 4/2011 | Abraham et al. |
| 8,700,657 B2 \* | 4/2014 | Frett ...................... H04H 60/66 |
| | | 707/769 |

(Continued)

OTHER PUBLICATIONS

Oracle, "Device Fingerprinting," Oracle Fusion Middleware Administrator's Guide for Oracle Adaptive Access Manager, [https://docs.oracle.com/html/E27207_01/finger.html], 2012 (13 pages).

(Continued)

*Primary Examiner* — Johnna R Loftis
(74) *Attorney, Agent, or Firm* — Hanley, Flight & Zimmerman, LLC

(57) ABSTRACT

Methods, apparatus, systems and articles of manufacture to expand panelist enrollment are disclosed. An example apparatus includes a fingerprint receiver to access a fingerprint received from a media device associated with a panelist, the panelist enrolled in a first panel corresponding to a first category of the media device, the fingerprint identifying devices communicating on a same local area network as the media device. The example apparatus includes a fingerprint analyzer to determine whether a second device within a second category of devices corresponding to a second panel is identified in the fingerprint, the second category of devices not including the media device. The example apparatus includes a panel opportunity identifier to prompt the panelist to join the second panel in response to the determination that the second device within the second category of devices is identified in the fingerprint.

17 Claims, 14 Drawing Sheets

(56) References Cited

U.S. PATENT DOCUMENTS

| | | | |
|---|---|---|---|
| 9,113,344 B1 | 8/2015 | Lee | |
| 9,668,020 B2* | 5/2017 | Nelson | H04N 21/44213 |
| 9,936,249 B1* | 4/2018 | Nelson | H04N 21/44213 |
| 2002/0168989 A1 | 11/2002 | Dooley et al. | |
| 2009/0234826 A1 | 9/2009 | Bidlack | |
| 2012/0245978 A1* | 9/2012 | Jain | G06Q 30/02 |
| | | | 705/7.34 |
| 2012/0271860 A1 | 10/2012 | Graham, Jr. et al. | |
| 2013/0202128 A1* | 8/2013 | Jain | G06Q 30/0201 |
| | | | 381/76 |
| 2014/0282665 A1* | 9/2014 | Arini | H04N 21/8358 |
| | | | 725/18 |
| 2014/0282669 A1* | 9/2014 | McMillan | H04N 21/44213 |
| | | | 725/19 |
| 2014/0334264 A1 | 11/2014 | Thaker | |
| 2015/0186536 A1* | 7/2015 | Bosworth | G06F 16/9535 |
| | | | 707/754 |
| 2015/0244820 A1* | 8/2015 | Verkasalo | H04L 67/22 |
| | | | 707/740 |

OTHER PUBLICATIONS

Navizon, "Technology: Learn more about Navizon's Global Positioning technology," [https://www.navizon.com/navizon-how-it-works.php], 2015 (2 pages).

* cited by examiner

300

| | 310 USER IDENTIFIER | 320 AGE | 330 INCOME |
|---|---|---|---|
| 340 | A | 24 | $30,000 per year |
| 350 | B | 32 | $92,000 per year |
| 360 | C | 48 | $45,000 per year |
| 370 | D | 63 | $47,000 per year |
| | ... | ... | ... |

FIG. 3

| USER IDENTIFIER | IOS PANEL | DESKTOP PANEL | ANDROID PANEL |
|---|---|---|---|
| A | YES | NO | NO |
| B | NO | YES | YES |
| C | NO | NO | YES |
| D | YES | NO | YES |
| ... | ... | ... | ... |

FIG. 4

| TIMESTAMP | IDENTIFIED ITEM |
|---|---|
| 12/8/2016 3:01PM | WIFI:STARBUCKS |
| 12/8/2016 4:53PM | DEVICE:MICROSOFT SURFACE PRO |
| 12/8/2016 4:53PM | DEVICE: APPLE IPAD |
| 12/8/2016 4:53PM | WIFI: HOMENET |
| 12/8/2016 6:08PM | DEVICE:MICROSOFT SURFACE PRO |
| 12/8/2016 6:08PM | WIFI: HOMENET |
| 12/8/2016 6:08PM | DEVICE:HP6300 (DESKTOP) |
| ... | ... |

FIG. 5A

| USER IDENTIFIER | FINGERPRINT DATA |
|---|---|
| A | PRIMARY DEVICE<br>    APPLE IPHONE 7<br><br>NETWORK NAMES<br>    IPA, HOMENET, STARBUCKS<br><br>SEEN DEVICES<br>    HP6300 (DESKTOP)<br>    MICROSOFT SURFACE PRO<br>    APPLE IPAD |
| B | PRIMARY DEVICE<br>    SAMSUNG GALAXY S6<br><br>NETWORK NAMES<br>    WIRELESSAP, STARBUCKS<br><br>SEEN DEVICES<br>    HP PRINTER<br>    GOOGLE CHROMECAST<br>    APPLE IPAD |
| ... | ... |

FIG. 8

| USER IDENTIFIER | PRIMARY DEVICE TYPE | COMMONLY SEES APPLE DEVICE | COMMONLY SEES DESKTOP | COMMONLY SEES ANDROID DEVICE |
|---|---|---|---|---|
| A | APPLE | YES | YES | NO |
| B | ANDROID | YES | YES | NO |
| ... | ... | ... | ... | ... |

FIG. 11

METHODS AND APPARATUS TO EXPAND PANELIST ENROLLMENT

FIELD OF THE DISCLOSURE

This disclosure relates generally to enrolling panelists, and, more particularly, to methods and apparatus to expand panelist enrollment.

BACKGROUND

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. Panelist devices (e.g., a mobile device, a tablet, etc.) are then instrumented with monitoring functionality that provides monitoring information (e.g., metering data) to the audience measurement entity.

BRIEF DESCRIPTION OF THE DRAWINGS

FIG. 3 is an example data table representing panelist demographic information collected by the central facility of FIG. 1.

FIG. 4 is an example data table representing panelist enrollment in various panels.

FIG. 5A is an example data table representing network identification data that may be collected by the example network scanner of FIG. 2.

FIG. 8 is an example data table representing fingerprint data collected from fingerprint generator(s) associated with various panelists.

FIG. 11 is an example data table representing whether the fingerprint generator(s) associated with various panelists commonly see devices of various device categories.

The figures are not to scale. Wherever possible, the same reference numbers will be used throughout the drawing(s) and accompanying written description to refer to the same or like parts.

DETAILED DESCRIPTION

Figure 1:
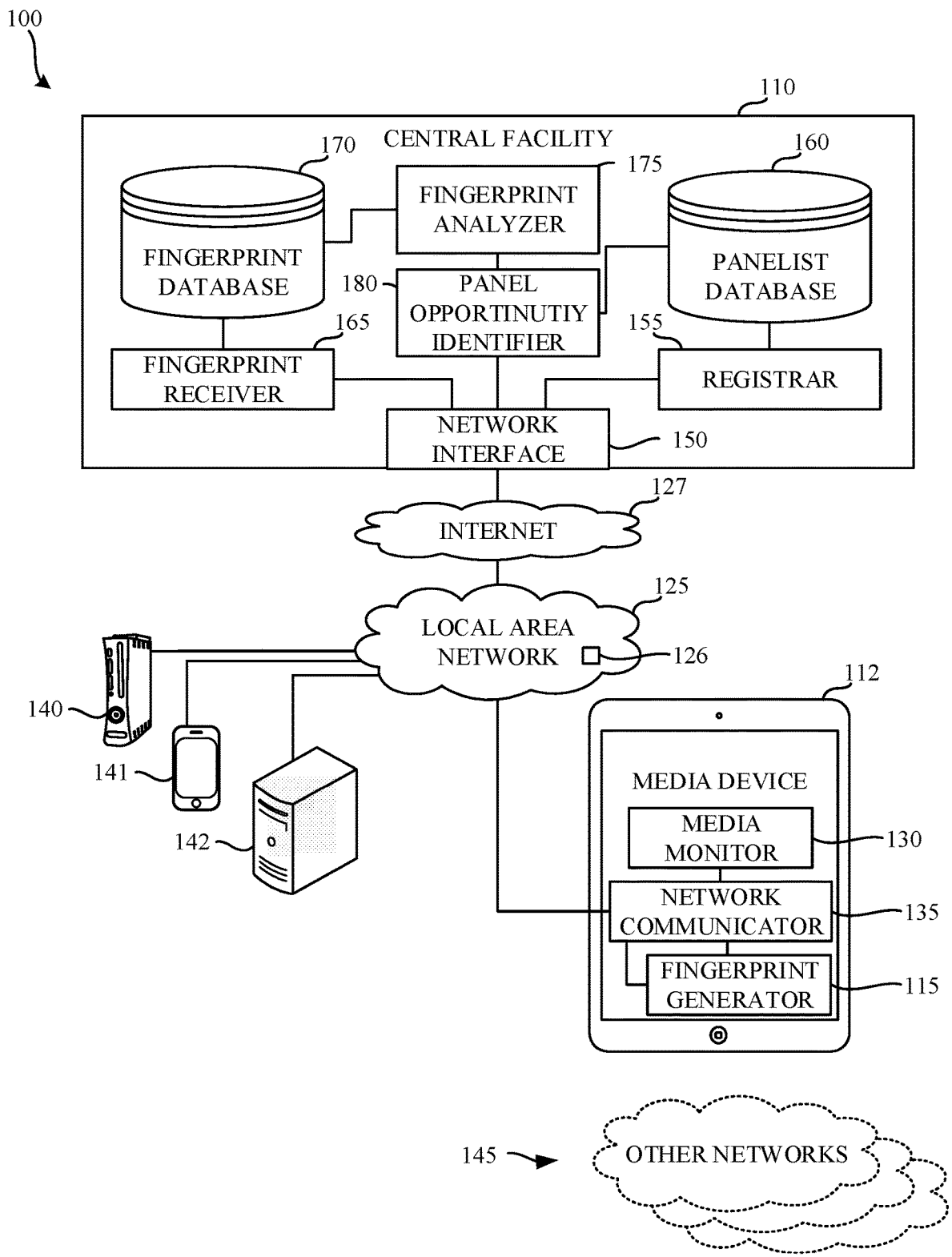
FIG. 1 is a block diagram of an example environment of use including an example system to facilitate expansion of panelist enrollment.

Monitoring companies desire knowledge on how users interact with media devices such as smartphones, tablets, laptops, smart televisions, etc. In particular, media monitoring companies want to monitor media presentations made at the media devices to, among other things, monitor exposure to advertisements, determine advertisement effectiveness, determine user behavior, identify purchasing behavior associated with various demographics, etc.

As used herein, the term "media" includes any type of content and/or advertisement delivered via any type of distribution medium. Thus, media includes television programming or advertisements, radio programming or advertisements, movies, web sites, streaming media, etc.

Traditionally, audience measurement entities (also referred to herein as "ratings entities") determine demographic reach for advertising and media programming based on registered panel members. People become panelists via, for example, a user interface presented on the media device (e.g., via a website). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.).

In some examples, panelists are recruited for participation in a particular panel that is specific to the type of device that they frequently use (e.g., a television, an Apple™ iPhone™, a desktop computer, a Google Android™ tablet, etc.). However, as the media presentation environment of a panelist may change over time (e.g., as the panelist acquires new media devices), the enrollment of the panelist in various panels may become outdated. That is, whereas a panelist participates in a first panel (e.g., an Apple™ iPhone™ panel), but subsequently acquires an Android™ tablet, that Android™ tablet might go unmonitored and the media consumption habits of the panelist might not be completely reflected in collected monitoring data. Enrolling a panelist in as many panels as possible enables a more holistic measurement to be made of the media presented to the panelist (e.g., as no or few media devices are omitted from the monitoring effort). In examples disclosed herein, when joining and/or registering for another panel, the panelist is not burdened to provide additional demographic information (or resubmit information previously provided by the panelist (e.g., provided during registration for another panel)), as such information was collected during a prior panel enrollment (e.g., the panelist does not provide additional demographic information). However, in some examples, the panelist may be requested by the registrar 155 to confirm and/or re-submit their demographic information.

Example approaches disclosed herein generate a fingerprint of devices that are detected near the primary device of the panelist (e.g., devices frequently detected near the primary device). As used herein, a fingerprint is a collection of information that can be used to identify information concerning the surroundings of a device. In some examples, the fingerprint can be used to identify a location of the device (e.g., whether the device has previously been in a location and/or is frequently in a location). In some examples, fingerprints from multiple different devices may be analyzed to determine whether they identify a same location. Example approaches for analyzing a fingerprint and/or information collected concerning devices detected near a device are disclosed in U.S. patent application Ser. No. 14/577,870, which is hereby incorporated by reference in its entirety.

The primary monitored device of the panelist is instrumented with a fingerprint generator that monitors, for example, the local area network to which the device is connected for other commonly seen devices. In some examples, other information is monitored as well, such as, for example, names of wireless networks that are commonly near the device, the local IP address of the device, etc. As used herein, devices and/or networks are considered to be commonly seen and/or commonly near the device when the devices and/or networks are detected a threshold number of times within a threshold time period. In some examples, other thresholds and/or criteria may additionally or alternatively be used such as, for example, whether the devices and/or networks were detected during a particular day of the week, time of the day, etc. The fingerprint generator reports such information to a central facility of the audience measurement entity. The central facility processes the fingerprints to identify whether the panelist is frequently near devices for which additional monitoring might be performed. For example, if a fingerprint of a panelist in the iPhone panel indicates that the panelist's iPhone is frequently near an Android™ tablet, a recruitment message may be presented to the panelist to request the panelist to also join an Android™ panel (e.g., to permit monitoring of the Android™ tablet). In some examples, activities other than recruitment messages may be performed such as, for example, a survey may be presented to the panelist.

FIG. 1 is a block diagram of an example environment of use including an example system to facilitate expansion of panelist enrollment. The example environment includes a central facility 110 in communication with a fingerprint generator 115 operated at a media device 112 via a local area network 125 and the Internet 127. A media monitor 130 operated at the media device 130 monitors media presented by the media device 112. Because many different types of media devices exist (e.g., Google Android™ devices, Apple™ devices, desktop computers, streaming media devices, etc.), different media monitors may be implemented for operation at different media monitors (e.g., a first media monitor may be operated on Google Android™ devices, whereas a second media monitor may be operated on Apple™ devices). Thus, panelists may participate in a panel(s) based on the type(s) of media devices that they own or, more specifically, the media monitors that their media devices are capable of operating.

Media monitoring information collected by the media monitor 130 is transmitted to the central facility 110 via a network communicator 135. The example fingerprint generator 115, via the network communicator 135, scans the local area network 125 to identify other devices 140, 141, 142 also connected to the local area network 125. In some examples, the example fingerprint generator 115 also identifies other wireless networks 145 near the media device 112. Information concerning the devices 140, 141, 142 connected to the local area network 125 and/or the other wireless networks 145 near the media device 112 is reported to the central facility 110. In examples disclosed herein, such collected information is unique to the media device 112 and, as a result, forms a fingerprint that might be used to identify information concerning the surroundings of the media device 112. In some examples, the central facility 110 reviews the fingerprint data to identify panelist recruitment opportunities.

The example central facility 110 of the illustrated example of FIG. 1 is operated by an audience measurement entity (AME). The example AME is a neutral third party (such as The Nielsen Company (US), LLC) who does not source, create, and/or distribute media and can, thus, provide unbiased ratings and/or other media monitoring statistics. To create the unbiased ratings and/or other media monitoring statistics, the AME operates the central facility 110. The example central facility 110 includes one or more servers that collect monitoring data from media monitors 130 and/or fingerprint generators 115 associated with media devices 112 and, based on the collected information, and develops audience measurement statistics and/or prepares reports. Although only one central facility 110 is shown in FIG. 1, many facilities may be provided for collecting the data. In some examples, these data collection facilities are structured in a tiered approach with many satellite collection facilities collecting data and forwarding the same to one or more central facilities 110. In the illustrated example of FIG. 1, the example central facility 110 includes a network interface 150, a registrar 155, a panelist database 160, a fingerprint receiver 165, a fingerprint database 170, a fingerprint analyzer 175, and a panel opportunity identifier 180.

The example network interface 150 of the illustrated example of FIG. 1 receives messages that include monitoring data and/or fingerprint data from the media device 112. In examples disclosed herein, the monitoring data identifies media that was presented by the media device 112. In some examples, the monitoring data identifies media that was not presented by the media device 112 itself, but was presented in proximity of the media device 112 (e.g., as monitored through a microphone of the media device).

In examples disclosed herein, the fingerprint data includes identifications of devices commonly found on the same local area network 125 as the media device 112. In some examples, information concerning other networks near the media device 112 (e.g., names of the nearby networks, signal strengths of the nearby networks, etc.) may be included in the fingerprint data.

In the example of FIG. 1, the registrar 155 receives registration information from a panelist and stores a record identifying the panelist and/or the panelist's media device 112. In the illustrated example, the received registration information includes demographic information. However, any other information may additionally or alternatively be collected. The registration information may include, for example, information identifying the model of the media device 112 associated with the panelist, a mailing address associated with the panelist, an email address associated with the panelist, a phone number associated with the media device 112, a unique identifier of the panelist and/or media device 112 (e.g., a social security number of the panelist, a phone number of the media device 112, a zip code of the panelist, and/or any combination or derivation of any information related to the panelist and/or the media device 112), the age of the panelist, the gender of the panelist, the race of the panelist, the marital status of the panelist, the income of the panelist and/or the household of the panelist, the employment status of the panelist, where the panelist typically intend to use the media device 112, how long the panelist has owned the media device 112, the education level of the panelist, and/or any other information related to the panelist and/or the media device 112. The example registrar 155 stores the received demographic information in the panelist database 160.

The example panelist database 160 of the illustrated example of FIG. 1 may be implemented by any device for storing data such as, for example, flash memory, magnetic media, optical media, etc. Furthermore, the data stored in the example panelist database 160 may be in any format such as, for example, binary data, comma separated data, tab delimited data, structured query language (SQL) structures, etc. While, in the illustrated example, the example panelist database 160 is illustrated as a single database, the example panelist database 160 may be implemented by any number and/or type(s) of database(s). The example panelist database 160 stores panelist demographic information received by the registrar 155. An example data table reflecting panelist registration data is described below in connection with FIG. 3. The example panelist database 160 stores monitoring data received from the media monitor 130 of the media device 112. In examples disclosed herein, the example panelist database 160 stores information concerning the panels in which the panelist is enrolled. An example data table reflecting identifications of the panels in which a panelist is enrolled is described below in connection with FIG. 4.

The example fingerprint receiver 165 of the illustrated example of FIG. 1 receives a fingerprint from the fingerprint generator 115, and stores the received fingerprint in the fingerprint database 170. In examples disclosed herein, the fingerprints are received via hypertext transfer protocol (HTTP) messages. However, any other past, present, and/or future messaging format and/or protocol may additionally or alternatively be used. In examples disclosed herein, the fingerprint receiver 165 updates the fingerprint stored in the fingerprint database 170 in connection with the panelist and/or fingerprint generator 115 from which the fingerprint is received. That is, previous versions of the fingerprint are overwritten. However, in some examples, the prior versions of the fingerprint(s) are retained such that they can be analyzed at a later time, if necessary. While in the illustrated example of FIG. 1 the example fingerprint receiver 165 receives a fingerprint from the fingerprint generator 115 (e.g., a fingerprint that has been generated by the fingerprint generator 115), in some examples, the fingerprint receiver 165 may receive information that would otherwise be used to create the fingerprint such that the fingerprint generation occurs at the central facility 110, rather than at the media device 112.

The example fingerprint database 170 of the illustrated example of FIG. 1 may be implemented by any device for storing data such as, for example, flash memory, magnetic media, optical media, etc. Furthermore, the data stored in the example fingerprint database 170 may be in any format such as, for example, binary data, comma separated data, tab delimited data, structured query language (SQL) structures, etc. While, in the illustrated example, the example fingerprint database 170 is illustrated as a single database, the example fingerprint database 170 may be implemented by any number and/or type(s) of database(s). The example fingerprint database 170 stores fingerprint information received from the fingerprint generators 115 of respective media devices 112.

The example fingerprint analyzer 175 of the illustrated example of FIG. 1 analyzes fingerprints stored in the fingerprint database 170 to determine whether a device of a particular category is commonly connected to the same local area network as the media device 112. In examples disclosed herein, pattern matching based on one or more patterns of device names (and/or other identifiers) is used to determine whether a device of a particular category is commonly connected to the same local area network as the media device 112. For example, the example fingerprint analyzer 175 may evaluate whether a device name matching the pattern "APPLE IPAD" to indicate a device is present in the category "APPLE DEVICE". In some examples, regular expressions and/or other pattern matching techniques may be used by the example fingerprint analyzer 175.

The example panel opportunity identifier 180 of the illustrated example of FIG. 1 identifies opportunities to present messages to panelists. Such messages may be used, for example, to request that the panelist enroll in another panel, to present a survey to the panelist, to confirm demographic information of the panelist, to confirm device ownership of the panelist, etc. In examples disclosed herein, the example panel opportunity identifier 180 compares fingerprint data parsed by the fingerprint analyzer 175 against panel opportunity data (e.g., a request for data provided by an administrator or other personnel of the audience measurement entity) and/or panelist information stored in the panelist database 160 to identify opportunities. In some examples, the example panel opportunity identifier 180 interacts with the fingerprint generator 115 (and/or another component of the media device 112) to present the message to the panelist.

The example media device 112 of the illustrated example of FIG. 1 is a device that is capable of presenting media. The example media device 112 may be, for example, a tablet, a laptop computer, a smart phone, etc. In the illustrated example, the media monitor 130 monitors media presentations of the media device 112, and reports monitoring data concerning such media presentations to the central facility 110. In some examples, the monitoring data is reported based on monitoring instructions implementing the media monitor 130 received from the audience measurement entity. For example, the media monitor 130 is implemented by an app and/or instructions downloaded to the media device 112 from the central facility 110 and/or an app store. However, any other approach to providing and/or structuring monitoring instructions, and/or reporting monitoring data to a central facility 110 may additionally or alternatively be employed. For example, the media monitor 130 may be structured in accordance with the teachings of Blumenau, U.S. Pat. No. 6,108,637.

In the illustrated example of FIG. 1, the media device 112 is associated with a single user. However, in some examples, the media device 112 may be associated with multiple users. In the illustrated example, the media device 112 communicates via the local area network 125. The example media device 112 communicates via any number of different local area networks during use of the media device (e.g., when the media device 112 is moved to a different physical location).

The example network communicator 135 of the illustrated example of FIG. 1 is a wireless radio that communicates with an access point of the local area network 125. In the illustrated example, the network communicator 135 includes a WiFi radio for communicating with the local area network 125 (and/or an access point of the local area network 125). However, any other number and/or type(s) of radios may additionally or alternatively be used such as, for example, a cellular radio. The example network communicator 135 may communicate using any past, present, and/or future communication protocols such as, for example, WiFi, Global System for Mobile Communications (GSM), code division multiple access (CDMA), long term evolution (LTE), etc.

In the illustrated example, the monitoring information (e.g., monitoring information collected by the media monitor 130 and/or the fingerprint generated by the fingerprint generator 115) is transmitted to the central facility 110 using an HTTP message. However, any other approach to transmitting data may additionally or alternatively be used such as, for example, a file transfer protocol (FTP), HTTP Secure (HTTPS), an HTTP Get request, Asynchronous JavaScript and extensible markup language (XML) (AJAX), etc.

The example fingerprint generator 115 of the illustrated example of FIG. 1 scans the local area network 125 to identify the other devices 140, 141, 142 also connected to the local area network 125. An example implementation of the fingerprint generator 115 is disclosed below in connection with FIG. 2. In some examples, the example fingerprint generator 115 also identifies other wireless networks 145 near the media device 112. Information concerning the devices 140, 141, 142 connected to the local area network 125 and/or the other wireless networks 145 near the media device 112 is reported to the central facility 110. In examples disclosed herein, such collected information is unique to the media device 112 and, as a result, forms a fingerprint that might be used to identify information concerning the surroundings of the media device 112. The example fingerprint generator 115 maintains a list of recently seen devices and/or networks, and uses such information to maintain a fingerprint representative of commonly seen devices and/or networks. The fingerprint is reported to the central facility 110.

Such fingerprint information is useful in that, if a panelist were enrolled in a particular panel (e.g., an iOS panel), but it was discovered an Android™ tablet was frequently seen on the same local area network as the media device, that panelist (or a family member of the panelist) may be more likely to join the Android™ panel. A solicitation to join the Android™ panel may then be presented to the panelist. Prompting existing panelists to join additional panels is advantageous because registration information for such panelist is already known (and may not need to be collected again). In some examples, other properties of the panelist might be considered such as, for example, how long the panelist has been a panelist, whether the panelist is compliant with operation of the media device, whether the panelist is responsive to requests from the audience measurement entity.

In some examples, the fingerprint information concerning the recently seen devices and/or networks might also be used to present a survey to the panelist. For example, if the media device 112 frequently sees a particular type of printer on the same local area network as the media device 112, a survey concerning the printer might be presented to the panelist. Additionally or alternatively, if the media device 112 is frequently near a wireless network commonly associated with a commercial establishment (e.g., a coffee shop, a restaurant, an airport), a survey may be presented concerning the commercial establishment.

The example local area network 125 of the illustrated example of FIG. 1 is a wireless LAN within a home of a panelist. However, in some examples, the example local area network 125 is at a location other than a home such as, for example, a library, a retail establishment, a public location, etc. In the illustrated example, the example local area network 125 includes an access point 126 (e.g., a router, a gateway, etc.) that is in communication with the Internet 127 via a service provider. In some examples, the access point 126 is a router that enables multiple devices in communication with the local area network 125 to communicate via the Internet 127. In the illustrated example, the access point 126 hosts the wireless local area network (LAN) using, for example, WiFi. However, any other past, present, and/or future approach to hosting a local area network may additionally or alternatively be used. The access point 126 issues a private IP address to each device that is communicatively coupled to the example local area network 125. The private IP address enables devices on the LAN (e.g., the media device 112, the devices 140, 141, 142) to communicate with the access point 126.

As mentioned above, within the LAN 125 hosted by the example access point 126, individual devices are each given a private IP address. In the illustrated example, the private IP addresses are assigned using a dynamic host of protocol (DHCP). When a device within the LAN 125 transmits a request to a resource outside the LAN 125 (e.g., on the Internet 127), the example access point 126 translates the originating private IP address of the device making the request to the public address of the example access point 126 before relaying the request outside the LAN 125 (e.g. to the destination). Thus, when the resource outside the LAN 125 receives the request, the resource is able to transmit a return response to the LAN 125 (and/or the access point 126). On the return path, the example access point 126 translates the destination IP address of the response to the private IP address of the requesting device so that the return message may be delivered to the device that made the original request.

As the panelist likely will carry the media device 112 throughout the day, the media device 112 is likely to encounter other networks 145. Such other networks 145 are, for example, wireless networks associated with various businesses, homes, etc. In examples disclosed herein, the other networks 145 are WiFi networks. However, any other networking technology may additionally or alternatively be used such as, for example, a cellular network. The example fingerprint generator 115 records information indicative of the presence of the other network 145 as part of the fingerprint data.

Figure 2:
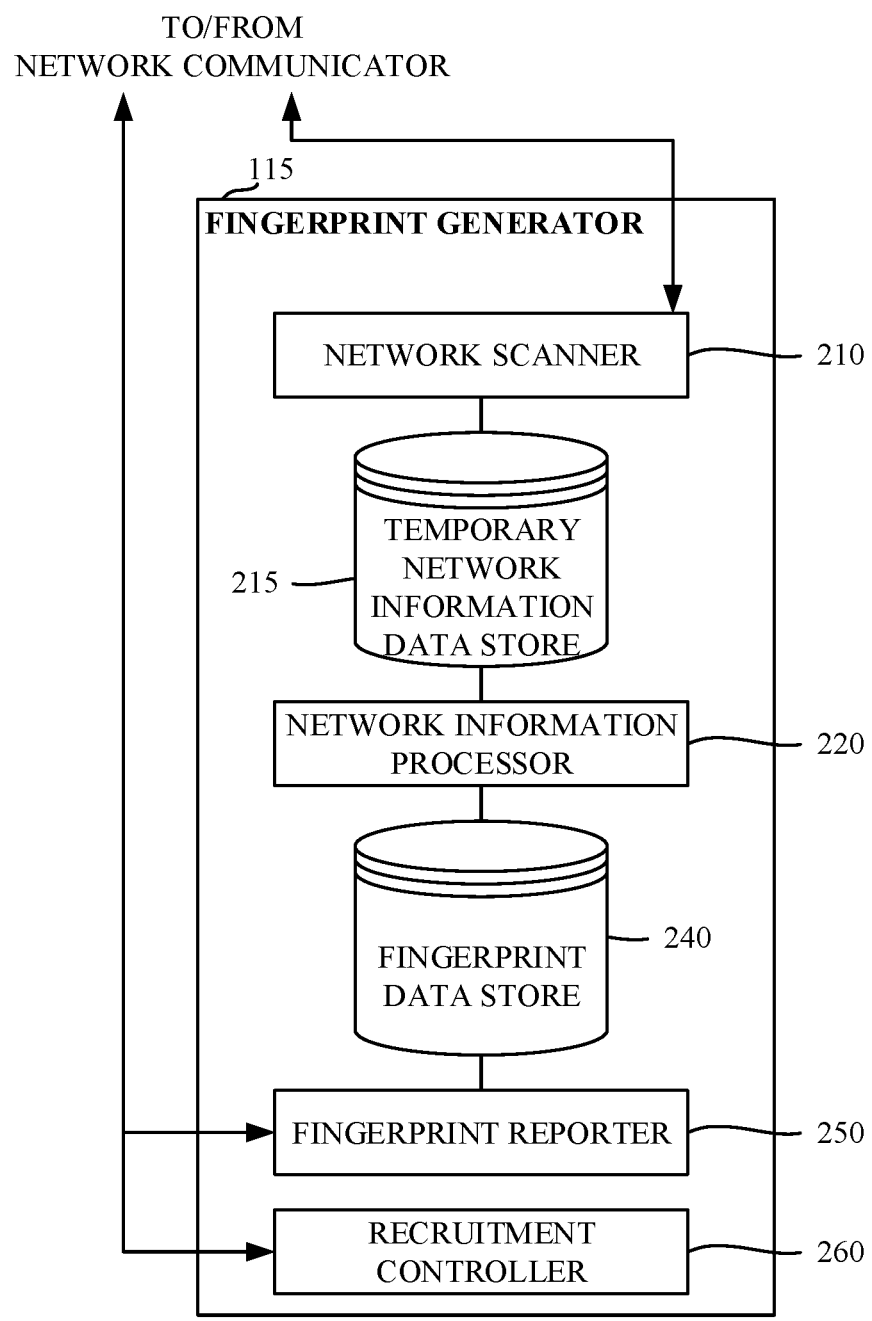
FIG. 2 is a block diagram of an example implementation of the example fingerprint generator of FIG. 1.

FIG. 2 is a block diagram of an example implementation of the example fingerprint generator of FIG. 1. The example fingerprint generator 115 of FIG. 2 includes a network scanner 210, a network information processor 220, a temporary network information data store 215, a fingerprint data store 240, a fingerprint reporter 250, and a recruitment controller 260. In operation, the network scanner 210 scans the local area network 125 to collects information concerning the other devices present on the local area network 125. The collected information is stored in the temporary network information data store 215. The network information processor 220 processes the information concerning the other devices present on the local area network 125 stored in the temporary network information data store 215 to create a fingerprint representing devices that are commonly seen by the media device 112. The example network information processor 220 stores the fingerprint in the fingerprint data store 240. The fingerprint reporter 250 reports the fingerprint stored in the fingerprint data store 240 to the central facility 110. Upon an indication from the central facility, the recruitment controller 260 presents an interface to the panelist.

The example network scanner 210 of the illustrated example of FIG. 2 scans the local area network 125 to which the media device 112 is connected to identify other devices on the local area network 125. In examples disclosed herein, the example network scanner 210 determines a possible range of IP addresses in use on the local area network, and transmits a message (e.g., an Internet Control Message Protocol (ICMP) echo request) to each potential IP address. If a response is received from the tested IP address, further investigation is performed to gather information concerning the device that responded at the tested IP address. For example, the IP address, the network name, a hardware identifier (e.g., a media access control (MAC) address) of the device, etc. may be identified. In some examples, a request (e.g., an HTTP request) may be transmitted to the device responding at the tested IP address and a response to the request may be analyzed to identify information concerning the device.

In some examples, the network scanner 210 interfaces with the network communicator 135 to identify a nearby wireless local area network. As used herein a wireless network is nearby when it is within wireless signal communication range. Wireless signal communication ranges might vary based on the location and/or wireless communication technology used. For example, a WiFi network typically has a wireless communication range of a three hundred feet. In some examples, the wireless communication range of a WiFi network is reduced by environmental impediments (e.g., walls, doors, trees, etc.). However, any other wireless communication technology having any other wireless communication range (e.g., a cellular communication having a range of a mile.) The example media device 112 does not need to be connected to the nearby wireless local area network. In some examples, the identification of the wireless local area network identifies a name (e.g., a Service Set Identifier (SSID)) of the wireless local area network, and a signal strength of the wireless local area network.

In some examples, a wireless network may be within the wireless signal communication range, but may have a very low signal strength. In some examples, when the signal strength of the wireless network is low, the wireless network is not considered nearby (even though the network is technically within the wireless signal communication range). Thus, in some examples, the example network scanner 210 determines whether the signal strength is greater than a threshold value when determining whether to consider the wireless local area network as nearby. Low signal strength is typically an indicator that the wireless network is within wireless communication range, but not very close to the media device 112. In some examples, the network scanner 210 identifies the network to which the media device is currently connected.

The example network scanner 210 stores identifications of devices connected to the same local area network as the media device 112 and/or identifications of nearby wireless local area networks in the example temporary network information data store 215. An example table representing data stored by the example network scanner 210 in the example temporary network information data store 215 is described below in connection with FIG. 5A.

The example temporary network information data store 215 of the illustrated example of FIG. 2 may be implemented by any device for storing data such as, for example, flash memory, magnetic media, optical media, etc. Furthermore, the data stored in the example temporary network information data store 215 may be in any format such as, for example, binary data, comma separated data, tab delimited data, structured query language (SQL) structures, etc. While, in the illustrated example, the example temporary network information data store 215 is illustrated as a single database, the example temporary network information data store 215 may be implemented by any number and/or type(s) of database(s). The example temporary network information data store 215 stores information concerning devices recently encountered on the same local area network as the media device 112 and/or wireless local area networks that have been nearby the media device 112. An example data table reflecting such information is described below in connection with FIG. 5A.

The example network information processor 220 of the illustrated example of FIG. 2 reviews entries in the temporary network information data store 215 to identify wireless networks that are commonly nearby the media device 112 and adds those identified wireless networks to the fingerprint stored in the example fingerprint data store 240. Likewise, the example network information processor 220 reviews entries in the temporary network information data store 215 to identify devices that are commonly connected to the same local area network as the media device 112 and adds those identified devices to the fingerprint stored in the example fingerprint data store 240.

In some examples, the example network information processor 220 adds a wireless network and/or a device identifier to the fingerprint when the network and/or device has been seen more than a first threshold number of times (e.g., ten times) within a first threshold period of time (e.g., the past week). However, any other thresholds and/or approaches to approach to determining when a wireless network and/or a device is commonly seen may additionally or alternatively be used. In some examples, the example network information processor 215 reviews devices identified in the fingerprint (e.g., stored in the fingerprint data store 240) to identify and remove wireless networks and/or devices that are no longer commonly seen from the fingerprint. For each wireless network and/or device identified in the fingerprint, the example network information processor 215 determines whether the wireless network and/or device has been identified a second threshold number of times (e.g., five times) within a second threshold period of time (e.g., the past month). As compared to the first threshold number of times and the first threshold period of time, the second threshold number of times and second threshold period of time are less restrictive. That is, a wireless network and/or device that was previously seen frequently such that it was added to the fingerprint, but is now seen occasionally, will remain a part of the fingerprint until it has not been seen the second threshold number of times within the second threshold period of time. However, any other thresholds may additionally or alternatively be used. Wireless networks and/or devices that do not meet the second threshold number of times within the second threshold period of time are removed from the fingerprint (but may later be re-added if they again become frequently seen). As with adding items to the fingerprint, different thresholds may be used when considering whether to remove a wireless network or a device from the fingerprint.

In addition to storing a wireless network identifier (e.g., a wireless network name) and/or a device identifier (e.g., a device name), any other information concerning the wireless network and/or device may additionally or alternatively be stored as part of the fingerprint. For example, the fingerprint may reflect a local IP address of the media device 112, a cellular signal strength reported by a cellular radio of the media device 112, a make and/or model of the other devices 140, 141, 142, a form factor of the other device 140, 141, 142, an age of the other device 140, 141, 142, a feature and/or functionality provided by the other device 140, 141, 142, etc.

The example fingerprint data store 240 of the illustrated example of FIG. 2 may be implemented by any device for storing data such as, for example, flash memory, magnetic media, optical media, etc. Furthermore, the data stored in the example fingerprint data store 240 may be in any format such as, for example, binary data, comma separated data, tab delimited data, structured query language (SQL) structures, etc. While, in the illustrated example, the example fingerprint data store 240 is illustrated as a single database, the example fingerprint data store 240 may be implemented by any number and/or type(s) of database(s). The example fingerprint data store 240 stores the fingerprint generated by the network information processor 220.

The example fingerprint reporter 250 of the illustrated example of FIG. 2 reports the fingerprint stored in the fingerprint data store 240 to the fingerprint receiver 165 of the central facility 110. In examples disclosed herein, the fingerprint reporter 250 reports the fingerprint periodically. However, any other period and/or aperiodic approach to reporting the fingerprint may additionally or alternatively be used. For example, the example fingerprint reporter 250 may report the fingerprint upon detection of a change in the fingerprint stored in the fingerprint data store 240. In examples disclosed herein, the fingerprint is reported using an HTTP message. However, any other approach to transmitting data may additionally or alternatively be used such as, for example, a file transfer protocol (FTP), HTTP Secure (HTTPS), an HTTP Get request, Asynchronous JavaScript and extensible markup language (XML) (AJAX), etc.

The example recruitment controller 260 of the illustrated example of FIG. 2 controls whether a recruitment interface (e.g., a solicitation to join a panel, a survey, etc.) is displayed to the user. In some examples, the recruitment controller 260 displays a demographic information collection interface that enables the panelist to verify their demographic information upon enrollment into a panel (e.g., the initial panel for a panelist, a subsequent/additional panel, etc.) When displaying the demographic information collection interface, the example recruitment controller 260 collects demographic information from the user and transmits the collected information to the central facility 110.

FIG. 3 is an example data table representing panelist demographic information collected by the central facility of FIG. 1. The example table 300 includes a first column 310 storing a user identifier (e.g., an identifier of the panelist issued by the registrar 155), a second column 320 storing first demographic information (e.g., an age), and a third column 330 storing second demographic information (e.g., an income). While in the illustrated example of FIG. 3 there are two columns storing demographic information, any other number of columns storing any other information may additionally or alternatively be used. For example, additional columns storing other demographic information (e.g., ethnicity, mailing address, sex, etc.) may be used. Additionally or alternatively, columns storing panelist information (e.g., a panelist account creation date, a "last accessed" date, user preferences, etc.) may be used.

In the illustrated example, four panelist records are shown. A first record 340 represents panelist "A". A second record 350 represents panelist "B". A third record 1087 represents panelist "C". A fourth record 370 represents panelist "D". While in the illustrated example of FIG. 3, four panelist records are shown, any other number of records may additionally or alternatively be used. For example, the panelist database 160 may store fifty thousand records respectively associated with fifth thousand panelists. In examples disclosed herein, panelist identifiers are simplified for ease of understanding. However, in practice, any identifier (e.g., a serial number, an MD5 hash of a name, etc.) may additionally or alternatively be used to identify a panelist.

FIG. 4 is an example data table 400 representing panelist enrollments in various panels. The example table 400 includes a first column 410 storing a user identifier (e.g., an identifier of the panelist issued by the registrar 155), a second column 420 indicating whether the panelist is enrolled in an iOS panel, a third column 430 indicating whether the panelist is enrolled in a desktop panel 430, and a fourth column 440 indicating whether the panelist is enrolled in an Android panel 440. In the illustrated example of FIG. 4, the second column 420, the third column 430, and the fourth column 440 indicate active and/or current panel enrollments. However, in some examples, past panel enrollment may additionally be reflected by the second column 420, the third column 430, and the fourth column 440 (e.g., whether a panelist was previously part of a panel but has since left the panel).

In the illustrated example of FIG. 4, four panelist records are shown, which correspond to the four panelist records of FIG. 3. A first record 450 indicates that panelist "A" is enrolled in the iOS panel, but not the desktop or Android panels. A second record 460 indicates that panelist "B" is enrolled in the desktop panel and the Android panel, but not the iOS panel. A third record 470 indicates that panelist "C" is enrolled in the Android panel, but not the iOS panel or the desktop panel. A fourth record 480 indicates that panelist "D" is enrolled in the iOS panel, but not the desktop or Android panels.

While an example manner of implementing the example central facility 110 is illustrated in FIG. 1 and an example manner of implementing the example fingerprint generator 115 of FIG. 1 is illustrated in FIG. 2, one or more of the elements, processes and/or devices illustrated in FIGS. 1 and/or 2 may be combined, divided, re-arranged, omitted, eliminated and/or implemented in any other way. Further, the example network interface 150, the example registrar 155, the example panelist database 160, the example fingerprint receiver 165, the example fingerprint database 170, the example fingerprint analyzer 175, the example panel opportunity identifier 180, and/or, more generally, the example central facility 110 of FIG. 1, the example network scanner 210, the example temporary network information data store 215, the example network information processor 220, the example fingerprint data store 240, the example fingerprint reporter 250, the example recruitment controller 250, and/or, more generally, the example fingerprint generator 115 of FIGS. 1 and/or 2 may be implemented by hardware, software, firmware and/or any combination of hardware, software and/or firmware. Thus, for example, any of the example network interface 150, the example registrar 155, the example panelist database 160, the example fingerprint receiver 165, the example fingerprint database 170, the example fingerprint analyzer 175, the example panel opportunity identifier 180, and/or, more generally, the example central facility 110 of FIG. 1, the example network scanner 210, the example temporary network information data store 215, the example network information processor 220, the example fingerprint data store 240, the example fingerprint reporter 250, the example recruitment controller 250, and/or, more generally, the example fingerprint generator 115 of FIGS. 1 and/or 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 150, the example registrar 155, the example panelist database 160, the example fingerprint receiver 165, the example fingerprint database 170, the example fingerprint analyzer 175, the example panel opportunity identifier 180, and/or, more generally, the example central facility 110 of FIG. 1, the example network scanner 210, the example temporary network information data store 215, the example network information processor 220, the example fingerprint data store 240, the example fingerprint reporter 250, the example recruitment controller 250, and/or, more generally, the example fingerprint generator 115 of FIGS. 1 and/or 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example central facility 110 of FIG. 1 and/or the example fingerprint generator 115 of FIGS. 1 and/or 2 may include one or more elements, processes and/or devices in addition to, or instead of, those illustrated in FIGS. 1 and/or 2, and/or may include more than one of any or all of the illustrated elements, processes and devices.

Figure 5:
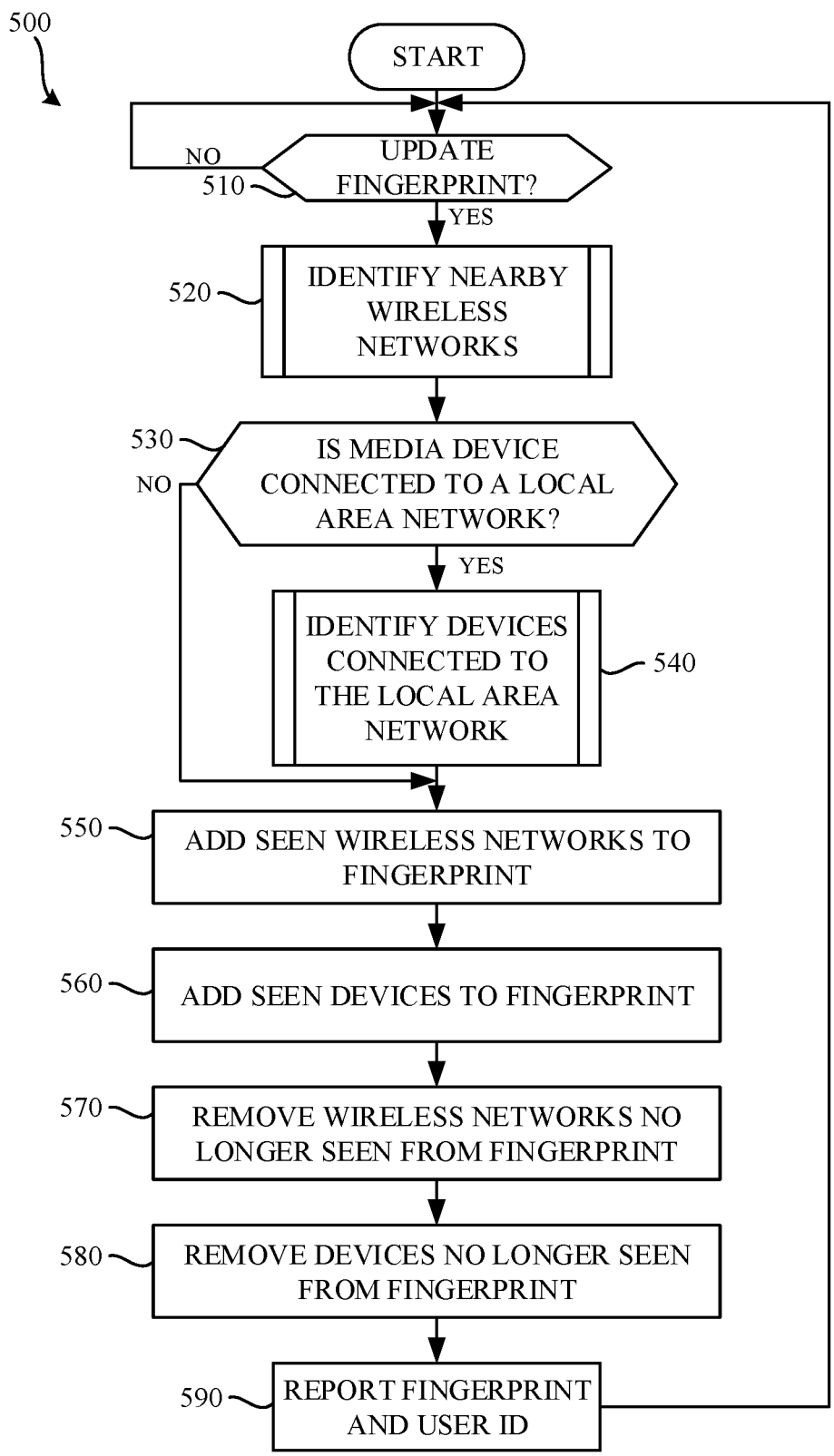
FIG. 5 is a flowchart representative of example machine readable instructions which may be executed to implement the example fingerprint generator of FIGS. 1 and/or 2 to generate a fingerprint.
Figure 6:
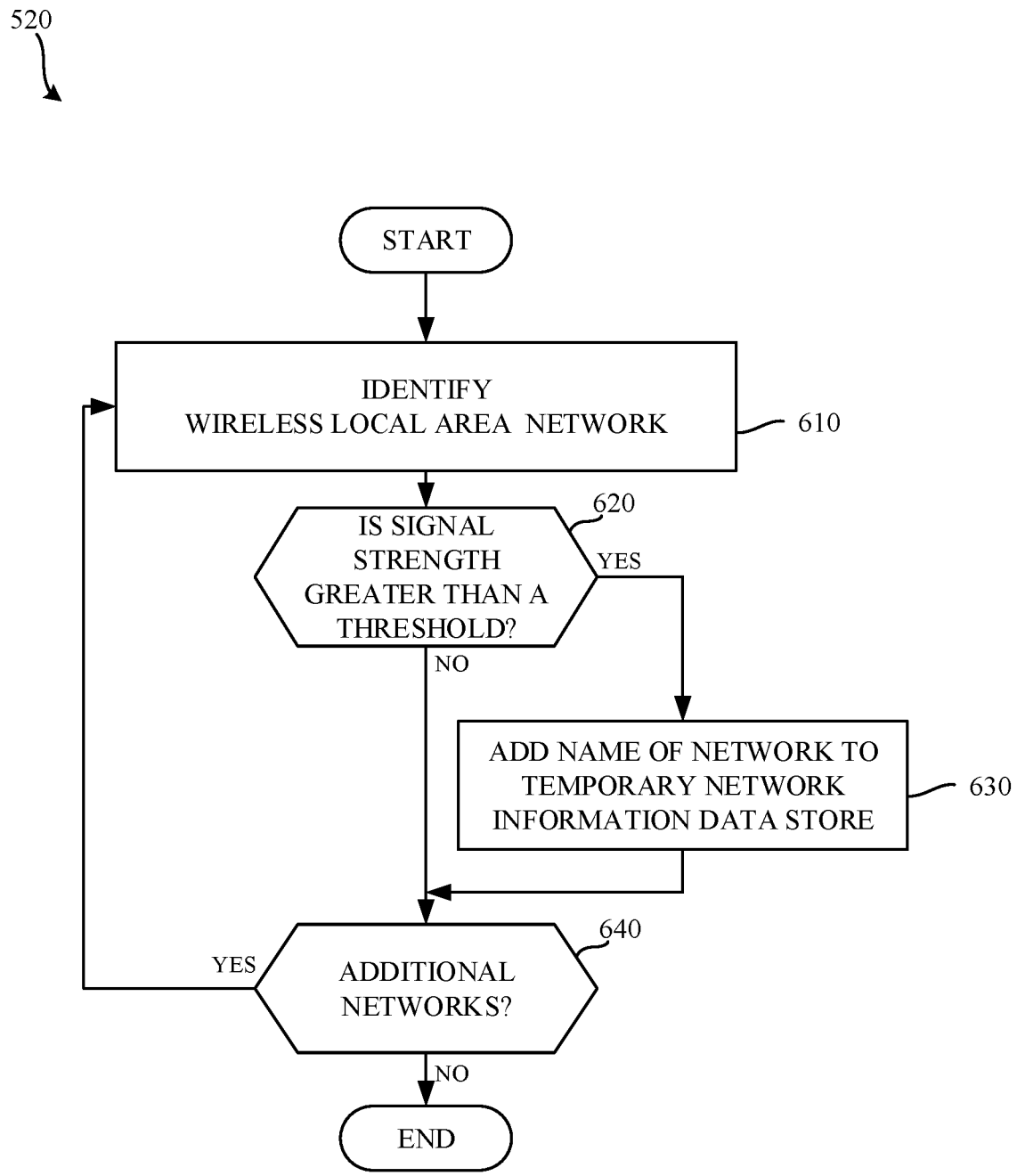
FIG. 6 is a flowchart representative of example machine readable instructions which may be executed to implement the example fingerprint generator of FIGS. 1 and/or 2 to identify nearby wireless networks.

Flowcharts representative of example machine readable instructions for implementing the example fingerprint generator 115 of FIGS. 1 and/or 2 are shown in FIGS. 5, 6, and/or 7. In these examples, the machine readable instructions comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 5, 6, and/or 7, many other methods of implementing the example fingerprint generator 115 may alternatively be used. For example, the order of execution of the blocks may be changed, and/or some of the blocks described may be changed, eliminated, or combined.

Figure 9:
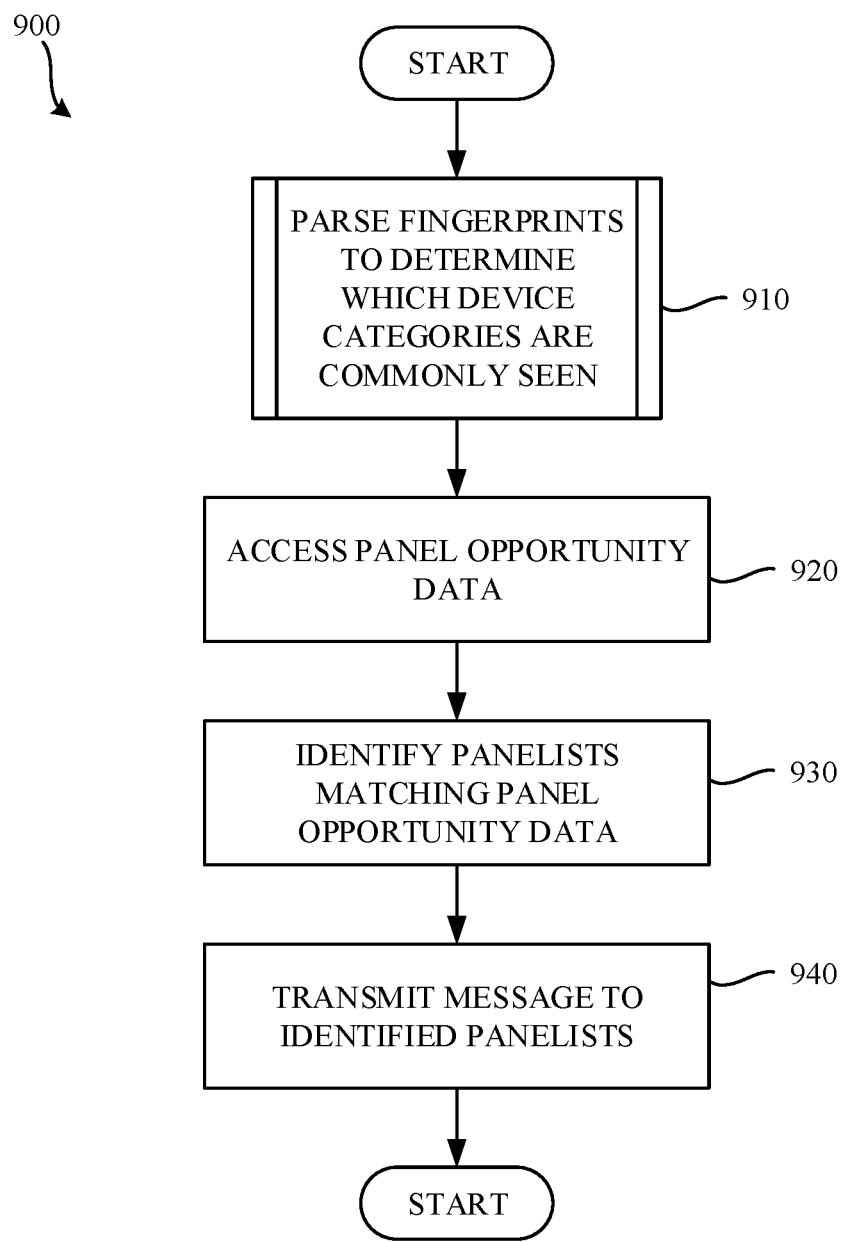
FIG. 9 is a flowchart representative of example machine readable instructions which may be executed to implement the example central facility of FIG. 1 to identify additional panelist enrollment opportunities.

Flowcharts representative of example machine readable instructions for implementing the example central facility 110 of FIG. 1 are shown in FIGS. 9 and/or 10. In these examples, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 9 and/or 10, many other methods of implementing the example central facility 110 may alternatively be used. For example, the order of execution of the blocks may be changed, and/or some of the blocks described may be changed, eliminated, or combined.

As mentioned above, the example processes of FIGS. 5, 6, 7, 9 and/or 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5, 6, 7, 9, and/or 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flowchart 500 representative of example machine readable instructions which may be executed to implement the example fingerprint generator of FIGS. 1 and/or 2 to generate a fingerprint. In the illustrated example of FIG. 5, the example fingerprint generator 115 of FIGS. 1 and/or 2 collects information concerning nearby wireless networks and/or devices connected to the local area network, and creates and/or updates a fingerprint for the media device 112. The example process 500 of FIG. 5 begins when the network information processor 220 determines that the fingerprint is to be updated (and/or created) (block 510). In the illustrated example of FIG. 5, the fingerprint is updated periodically. As such, the example network information processor 220 determines whether a threshold time has been reached by consulting a counter or other time tracking device. However, any other periodic and/or aperiodic approach to determining whether the fingerprint should be updated may additionally or alternatively be used. In examples disclosed herein, the example network information processor 220 may additionally or alternatively determine that the fingerprint is to be updated based on a schedule (e.g., updates are to be performed at one or more times per day, one or more days per week, etc.). Using a schedule in addition to or as an alternative to a periodic fingerprint updating approach ensures that additional devices belonging to other family members (which tend to be discovered in the evening and throughout the night when the whole family is at home or over the weekend) are identified. If, for example, updating were performed primarily in the mornings and rarely in the evenings and/or overnight, devices associated with family members might not be identified as part of the fingerprint and/or may be removed from the fingerprint.

If the fingerprint is to be updated (block 510 returns a result of YES), the example network scanner 210 identifies nearby wireless networks (block 520). Identified wireless networks are stored in the temporary network information data store 215. An example data table 591, shown in FIG. 5A, representative of the example data stored in the temporary network information data store 215 is described below. An example approach to identifying nearby wireless networks is disclosed in connection with FIG. 6.

FIG. 6 is a flowchart representative of example machine readable instructions which may be executed to implement the example fingerprint generator of FIGS. 1 and/or 2 to identify nearby wireless networks. The example process 520 of the illustrated example of FIG. 6 begins when the example network scanner 210 determines that a scan is to be performed (block 520 of FIG. 5). In the illustrated example, the example network scanner 210 interfaces with the network communicator 135 to identify a nearby wireless local area network (block 610). In the illustrated example of FIG. 6, the identification of the wireless local area network identifies a name (e.g., a Service Set Identifier (SSID)) of the wireless local area network, and a signal strength of the wireless local area network. The example network scanner 210 determines whether the signal strength is greater than a threshold value (block 620). In examples disclosed herein, the signal strength threshold is −60 decibels (dB). However, any other threshold value may additionally or alternatively be used. If the signal strength is greater than the threshold (block 620 returns a result of YES), the example network scanner adds a record of the name of the network (and/or the signal strength) to the temporary network information data store 215 (block 630). As a result, wireless networks that do not meet the threshold signal strength are not stored in the temporary network information data store 215. The example determines whether there are nearby networks (block 640). If there are additional nearby networks (block 640 returns a result of YES), the process of FIG. 6 is repeated until no additional nearby wireless local area networks exist for identification. Once all nearby networks have been identified (block 640 returns a result of NO), the process of FIG. 6 terminates.

Returning to FIG. 5, the example network scanner 210 determines whether the media device 112 is connected to a local area network 125 (block 530). In some examples, the example network scanner 210 determines whether the media device 112 is connected to the local area network 125 by determining whether the media device 112 has been issued an IP address on the local area network 125. If the media device 112 is connected to the local area network (block 530 returns a result of YES), the example network scanner identifies devices connected to the local area network (block 540). Identifications of identified devices are stored in the temporary network information data store 215. The example data table 591 of FIG. 5A represents the example data stored in the temporary network information data store 215, and is described below. An example approach to identifying devices connected to the local area network is disclosed in FIG. 7.

Figure 7:
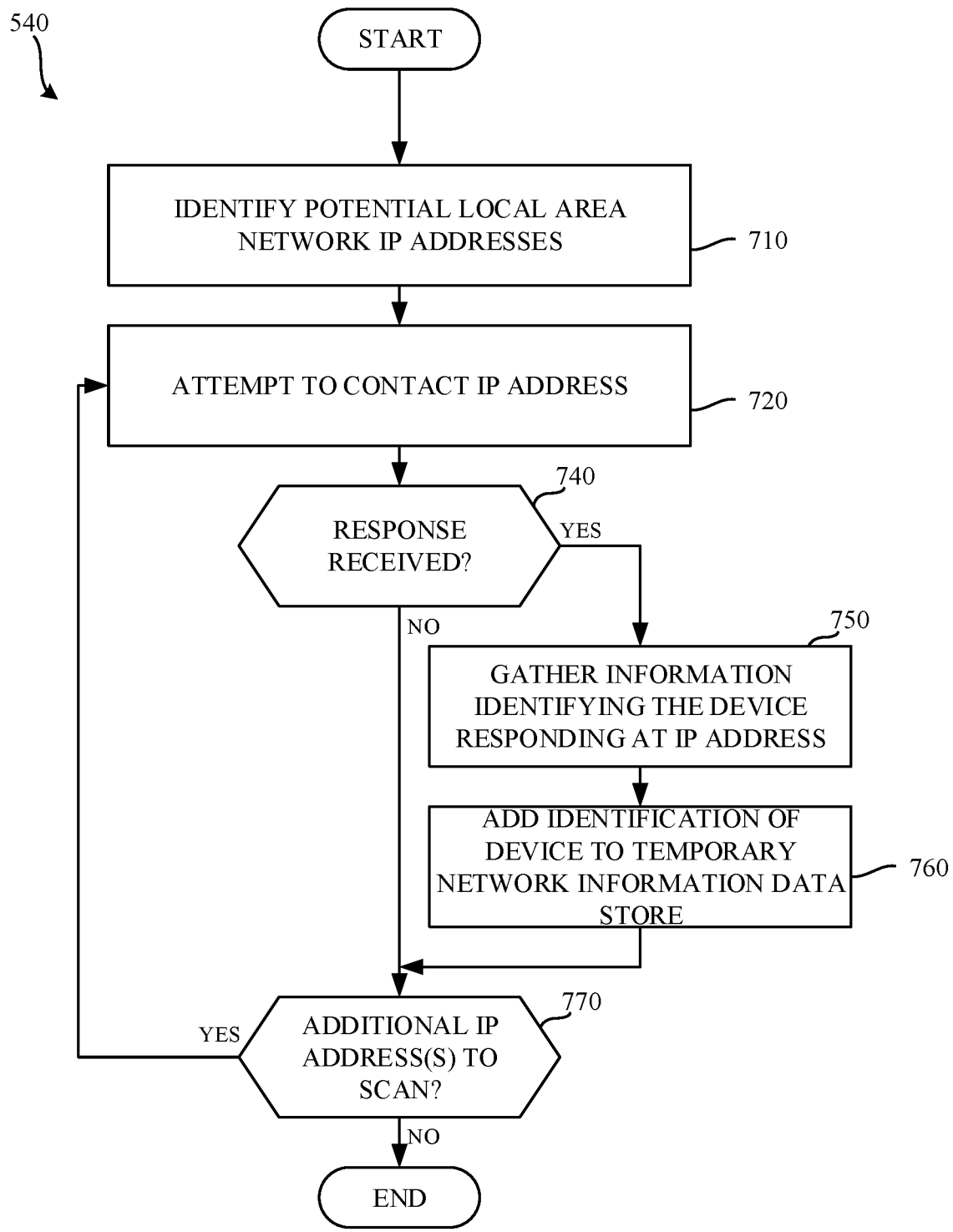
FIG. 7 is a flowchart representative of example machine readable instructions which may be executed to implement the example fingerprint generator of FIGS. 1 and/or 2 to identify nearby devices.

FIG. 7 is a flowchart representative of example machine readable instructions which may be executed to implement the example fingerprint generator of FIGS. 1 and/or 2 to identify nearby devices. The example process 540 of the illustrated example of FIG. 7 begins when the example network scanner 210 determines that a scan is to be performed (block 530 of FIG. 5). In the illustrated example, the example network scanner 210 identifies potential local area network IP addresses that may be used by other devices (block 710). In the illustrated example, the example network scanner 210 identifies potential local area network IP addresses based on a subnet that the private IP address of the media device 112 is part of. Identifying potential local area network IP addresses based on the subnet of which the fixed device is a part of reduces the overall search space of potential addresses (e.g., any potential private IP address) to potential IP addresses that are in use on the local area network 125. The example network scanner 210 transmits a message (e.g., an ICMP echo request) to each potential IP address from the reduced search space. (Block 720). The example network scanner 210 awaits a response to the message. (Block 740).

If a response is received, the example network scanner 210 interrogates the device to gather identifying information concerning the device that responded at the tested IP address. (Block 750). In some examples, a hardware identifier of the device is gathered. In the illustrated example, the hardware identifier is the media access control (MAC) address and can be used to determine a make and/or a model of the other device. However, any other approach to gathering identifying information concerning the device that responded at the tested IP address may additionally or alternatively be used such as, for example, an HTTP request, a NetBIOS request, etc. In some examples, the identifying information is the IP address of the device that responded at the tested IP address. In such an example, further interrogation of the device to gather identifying information might not be necessary (as the IP address is known based on the test that was performed in connection with block 720). In some examples, the IP addresses in use on the network (and/or other identifying information) form a fingerprint for the network, thereby enabling an identification of whether the device is at a previously known (e.g., previously fingerprinted) location. Additionally or alternatively, the fingerprint for the network might be used to determine when a first device is at a same location as a second device (e.g., when the fingerprints match).

The example network scanner 210 adds the information identifying the device to the temporary network information data store 215. (Block 760). In examples disclosed herein, a timestamp representing the time at which the device was identified is also stored. Storing the timestamp enables a determination of whether the device frequently and/or recently connected to the same LAN 125 as the media device 112.

The example network scanner 210 waits a threshold amount of time to determine if a response has been received from the tested IP address. In the illustrated example, the example network scanner 210 waits for one second, as most devices on a local area network will return a response within a matter of milliseconds. However, any other threshold amount of time may additionally or alternatively be used. If no response was received from a tested IP address within the threshold amount of time (Block 740 returns a result of NO), or once the hardware address has been reported (Block 760), the example network scanner 210 determines whether there are additional IP addresses to scan. (Block 770). If there are additional IP addresses to scan, control returns to block 720, where the additional IP addresses are scanned in the manner described above. The example network scanner 210 continues to perform the network scan until all potential local-area network IP addresses have been tested. Once all IP addresses have been tested (e.g., block 770 returns a result of NO), the example process of FIG. 7 terminates.

Returning to FIG. 5, upon completion of the identification of devices connected to the local area network (block 540) or the determination that the media device 112 is not connected to the local area network 125 (block 530 returning a result of NO), the example network information processor 220 reviews entries in the temporary network information data store 215. As noted above, the example data table 591 of FIG. 5A represents example data stored in the temporary network information data store 215. The example data table 591 of FIG. 5A includes a timestamp column 589 and an identified item column 592. However, any other information may additionally or alternatively be stored such as, for example, signal strengths of identified wireless networks, additional identifiers of identified devices, etc. The example data table 591 of FIG. 5A includes a first record 593, a second record 594, a third record 595, a fourth record 596, a fifth record 597, a sixth record 598, and a seventh record 599. In practice, many additional records will likely be recorded representative of many other identified devices and/or wireless networks identified by the network scanner 210. In the illustrated example of FIG. 5A, the first record 593 identifies a first time when the media device 112 was near a "STARBUCKS" wireless network. The second record 594, the third record 595, and the fourth record 596 identify a second time when the media device 112 was connected to a home network that also had a Microsoft™ Surface Pro™ computer and an Apple iPad™ connected. The fifth record 597, the sixth record 598, and the seventh record 599 identify a third time when the media device was connected to the home network, which also had the Microsoft Surface Pro computer, and an HP desktop computer connected.

The example network information processor 220 reviews entries in the temporary network information data store 215 to identify wireless networks that are commonly nearby the media device 112 and adds those identified wireless networks to the fingerprint (block 550) stored in the example fingerprint data store 240. In examples disclosed herein, when a wireless network is seen more than a first threshold number of times (e.g., ten times) within a first threshold period of time (e.g., the past week), the wireless network is considered to be commonly nearby the media device 112. However, any other thresholds and/or approaches to approach to determining when a wireless network is commonly seen may additionally or alternatively be used.

Likewise, the example network information processor 220 reviews entries in the temporary network information data store 215 to identify devices that are commonly connected to the same local area network as the media device 112 and adds those identified devices to the fingerprint (block 560) stored in the example fingerprint data store 240. In examples disclosed herein, when a device is seen more than the first threshold number of times (e.g., ten times) within the first threshold period of time (e.g., the past week), the device is considered to be commonly connected to the same local area network as the media device 112. However, any other thresholds and/or approaches to approach to determining when a wireless network is commonly seen may additionally or alternatively be used. Moreover, different thresholds may be used when identifying commonly seen devices as compared to commonly seen wireless networks.

The example network information processor 215 reviews wireless networks identified in the fingerprint (e.g., stored in the fingerprint data store 240) to identify and remove wireless networks that are no longer commonly seen from the fingerprint (block 570). For each wireless network identified in the fingerprint, the example network information processor 215 determines whether the wireless network has been identified a second threshold number of times (e.g., five times) within a second threshold period of time (e.g., the past month). In the illustrated example of FIG. 5, as compared to the first threshold number of times and the first threshold period of time, the second threshold number of times and second threshold period of time are less restrictive. That is, a network that was previously seen frequently such that it was added to the fingerprint, but is now seen occasionally, will remain a part of the fingerprint until it has not been seen the second threshold number of times within the second threshold period of time. However, any other thresholds may additionally or alternatively be used. Wireless networks that do not meet the second threshold number of times within the second threshold period of time are removed from the fingerprint (but may later be re-added if they again become frequently seen).

The example network information processor 215 reviews devices identified in the fingerprint (e.g., stored in the fingerprint data store 240) to identify and remove devices that are no longer commonly seen from the fingerprint (block 570). For each device identified in the fingerprint, the example network information processor 215 determines whether the device has been identified a second threshold number of times (e.g., five times) within a second threshold period of time (e.g., the past month). In the illustrated example of FIG. 5, as compared to the first threshold number of times and the first threshold period of time, the second threshold number of times and second threshold period of time are less restrictive. That is, a device that was previously seen frequently such that it was added to the fingerprint, but is now seen occasionally, will remain a part of the fingerprint until it has not been seen the second threshold number of times within the second threshold period of time. However, any other thresholds may additionally or alternatively be used. Devices that do not meet the second threshold number of times within the second threshold period of time are removed from the fingerprint (but may later be re-added if they again become frequently seen). As with adding items to the fingerprint, different thresholds may be used when considering whether to remove a wireless network or a device from the fingerprint.

Upon addition of newly identified wireless networks and/or devices to the fingerprint and removal of wireless networks and/or devices from the fingerprint that are no longer commonly seen, the example fingerprint reporter 250 reports the fingerprint to the fingerprint receiver 165 of the central facility 110 (block 590). The fingerprint receiver 165 stores the reported fingerprint in the fingerprint database 170 for subsequent analysis by the fingerprint analyzer 175. In examples disclosed herein, the fingerprint reporter 250 additionally transmits the user identifier of the panelist and/or some other information that enables the central facility 110 to identify the panelist. In this manner, the fingerprint may evolve over time as the habits and/or device ownership of the panelist evolve. The example process of FIG. 5 then repeats to continually update the fingerprint and provide the same to the central facility 110.

FIG. 8 is an example data table 800 representing fingerprint data collected from fingerprint generator(s) associated with various panelists. The example data table 800 of FIG. 8 includes a first column 810 storing a user identifier (e.g., an identifier of the panelist as reported by the fingerprint generator 115), a second column 820 storing the reported fingerprint. In some examples, additional columns identifying, for example, when the most recent fingerprint was received, an IP address of the media device when the most recent fingerprint was received, etc. The example data table 800 of FIG. 8 includes a first record 830 and a second record 840. In practice, the example data table 800 will include many more records corresponding to many more fingerprint generators 115 reporting respective fingerprints.

The first example record 830 identifies that the media device used by panelist "A" is an Apple iPhone 7, which is commonly is nearby wireless networks named "IPA", "HOMENET", and "STARBUCKS", and is commonly connected to a same local area network as devices named "HP 6300 (DESKTOP)", "MICROSOFT SURFACE PRO", and "APPLE IPAD." The second example record 840 identifies that the media device used by panelist "B" is a Samsung Galaxy S6, which is commonly nearby wireless networks named "WIRELESSAP" and "STARBUCKS", and is commonly connected to a same local area network as devices named "HP PRINTER", "GOOGLE CHROMECAST", and "APPLE IPAD".

FIG. 9 is a flowchart representative of example machine readable instructions 900 which may be executed to implement the example central facility 110 of FIG. 1 to identify additional panelist enrollment opportunities. The example program 900 of FIG. 9 begins when the example fingerprint analyzer 175 parses fingerprints stored in the fingerprint database 170 to determine which device categories are commonly seen (block 910). While individual fingerprints report which devices are commonly seen, many different devices exist. Because panel participation is generally tied to whether a panelist owns a particular type of device capable of operating a corresponding media monitor (e.g., the media monitor 130), in examples disclosed herein, commonly seen devices are grouped into categories of devices. In some examples, devices are categorized based on an operating system of the media device. However, any other property of the device may be used for categorization such as, for example, a make and/or model of the device, a form factor of the device, an age of the device, a feature and/or functionality provided by the device, etc. An example approach to parsing fingerprint data to categorize the devices included in the fingerprint is described below in connection with FIG. 10. A result of the parsing operation is shown in the example data table 1100 of FIG. 11.

Figure 10:
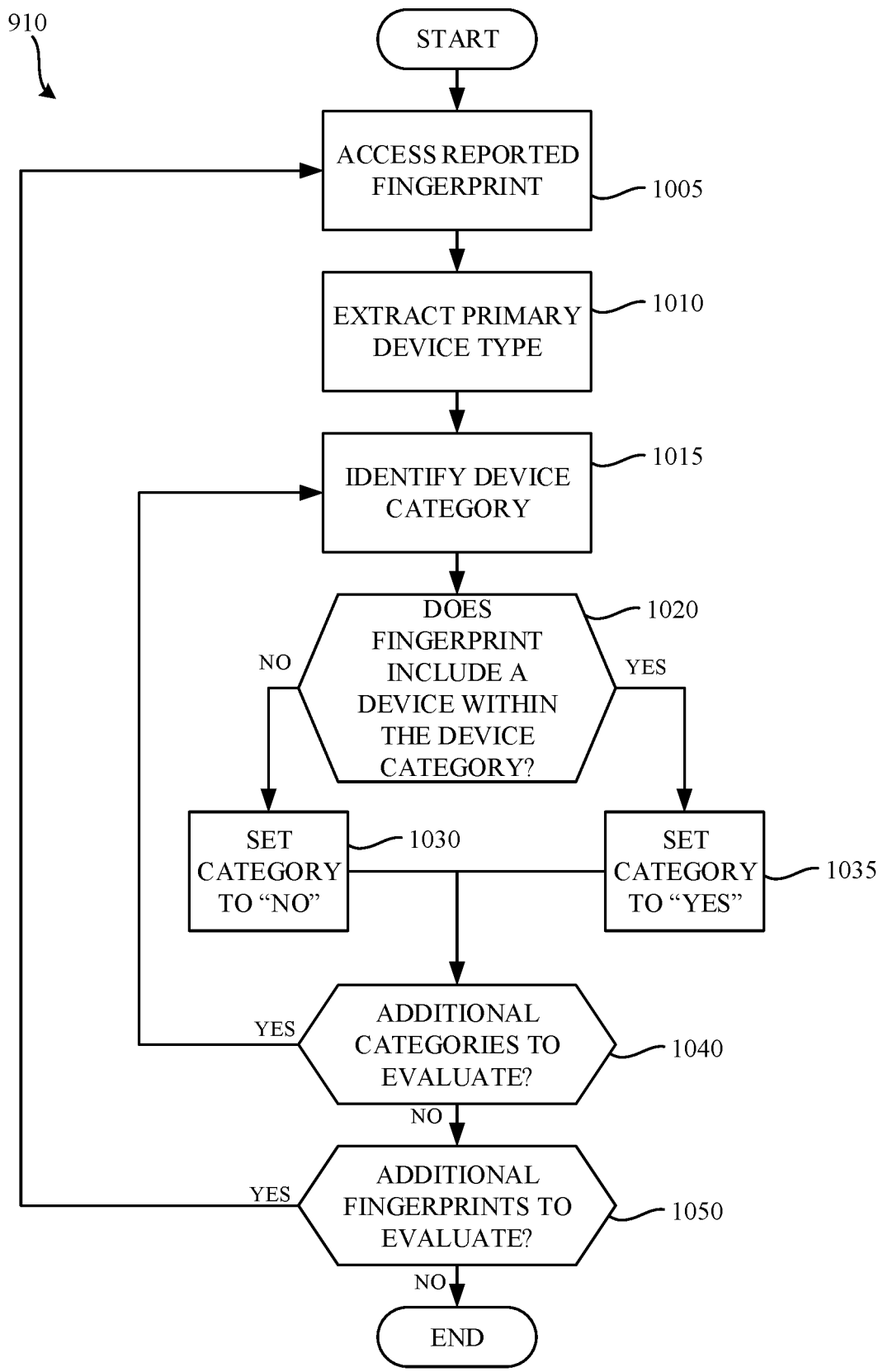
FIG. 10 is a flowchart representative of example machine readable instructions which may be executed to implement the example central facility of FIG. 1 to parse fingerprint data.

FIG. 10 is a flowchart representative of example machine readable instructions 1000 which may be executed to implement the example central facility of FIG. 1 to parse fingerprint data. The example process 1000 of FIG. 10 begins when the example fingerprint analyzer 175 accesses a reported fingerprint for a panelist (block 1005). In examples disclosed herein, each fingerprint generator reports a single fingerprint. However, in some examples, the panelist might operate multiple media devices that generate their own unique fingerprint. In such an example, the fingerprints may be combined and/or analyzed together.

The example fingerprint analyzer 175 extracts a primary device type from the fingerprint (block 1010) and stores the primary device type in a parsed fingerprint table (e.g., the parsed fingerprint data table 1100 of FIG. 11) stored in the fingerprint database 170. The example fingerprint analyzer 175 identifies a device category of interest (block 1015). In the illustrated example of FIG. 10, devices are categorized based on an operating system of the device. However, any other property of the device may additionally or alternatively be used to categorize a device. For example, a make and/or model of the device, a form factor of the device, an age of the device, a feature and/or functionality provided by the device, etc. may be used to categorize the device. The example fingerprint analyzer 175 determines whether the fingerprint includes a device within the category (block 1020). In examples disclosed herein, the example fingerprint analyzer 175 determines whether the fingerprint includes a device within the category by identifying one or more patterns of device names and/or properties associated with the category, and determining if any of the device names match one of the one or more patterns. If the example fingerprint analyzer 175 determines that the fingerprint does not include a device within the category (block 1020 returns a result of NO), the example fingerprint analyzer 175 stores a value indicating that no device within the category is present in a corresponding column of the parsed fingerprint table stored in the fingerprint database 170 (block 1030). If the example fingerprint analyzer 175 determines that the fingerprint includes a device within the category (block 1020 returns a result of YES), the example fingerprint analyzer 175 stores a value indicating that a device within the category is present in the corresponding column of the parsed fingerprint table stored in the fingerprint database 170 (block 1035). For example, the pattern "APPLE IPAD" may be used to indicate a device present in the category "APPLE DEVICE", and upon analyzing the fingerprint for panelist "A" (see record 830 of FIG. 8), the example fingerprint analyzer 175 identifies the device "APPLE IPAD" and records a "YES" in the corresponding column 1130 of FIG. 11.

The example fingerprint analyzer 175 determines whether there are any additional categories to evaluate (block 1040). If there are additional categories to evaluate (block 1040 returns a result of YES), the example process of blocks 1015 through 1040 is repeated until no additional categories exist for evaluation (until block 1040 returns a result of NO). The example fingerprint analyzer 175 determines whether there are any additional fingerprints to evaluate (block 1050). If there are additional fingerprints to evaluate (block 1050 returns a result of YES), the example process of blocks 1005 through 1050 is repeated until no additional fingerprints exist for evaluation (until block 1050 returns a result of NO). FIG. 10 then terminates and control proceeds to block 920 of FIG. 9.

FIG. 11 is an example data table 1100 representing whether the fingerprint generator(s) associated with various panelists commonly see devices of various device categories. The example data table 1100 of FIG. 11 may be stored in the example fingerprint database 170 of FIG. 1. The example data table 1100 includes a user identifier column 1110, a primary device type column 1120, a first category column 1130, a second category column 1140, and a third category column 1145. In the illustrated example of FIG. 11, the primary device type column 1120 identifies the primary device of the corresponding panelist. In examples where the panelist uses multiple media devices (each which may report their own fingerprints), the primary device type column 1120 may be omitted and/or may be stored in a different location in connection with the user identifier column 1110 (e.g., in the panelist database 160).

The example first category column 1130 identifies whether the media device 112 is commonly connected to a same local area network as an Apple device (e.g., an Apple™ iPad™, an Apple™ iPhone™, etc.). The example second category column 1140 identifies whether the media device 112 is commonly connected to a same local area network as a desktop computer. The example third category column 1145 identifies whether the media device 112 is commonly connected to a same local area network as a Google Android™ device (e.g., a Samsung™ Galaxy S6™, a Samsung™ Galaxy S7™, etc.). While in the illustrated example of FIG. 11, three category columns are shown, any number of category columns having any level of granularity (e.g., smartphones, make of smartphone, make and model of smartphone, operating system of a particular make and model of smartphone, etc.) may additionally or alternatively be used.

The example data table 1100 of FIG. 11 includes a first record 1150 that identifies that panelist "A" primarily uses an Apple™ device that is commonly connected to a same wireless network as another Apple™ device and a desktop computer. The example data table 1100 of FIG. 11 includes a second record 1160 that identifies that panelist "B" primarily uses an Android™ device that is commonly connected to a same wireless network as an Apple™ device and a desktop computer. Based on this information, a panel opportunity may exist for panelist "B", in that they are a user of an Android™ device but are commonly connected to a same wireless network as an Apple™ device. From this information, it may be deduced that a member of the panelist's household (or the panelist themselves) uses an Apple™ device, and might be interested in joining a panel specific to use of Apple™ devices.

Returning to FIG. 9, the example panel opportunity identifier 180 accesses panel opportunity data (block 920). In examples disclosed herein, the panel opportunity data is provided by an administrator of the central facility 110. However, the panel opportunity data may be provided in any other fashion. In some examples the panel opportunity data includes parameters that indicate, for example, that users that are not part of a particular panel but commonly see devices of a particular type corresponding to the particular panel should be invited to participate in the panel corresponding to the commonly seen device type. Additionally or alternatively, the panel opportunity data may indicate that panelists that are commonly near a particular wireless network associated with an establishment (e.g., a network associated with a coffee shop, an airport, a restaurant, a store, etc.) may be surveyed concerning their patronage at the establishment.

The example panel opportunity identifier 180 queries the parsed fingerprint data (e.g., the example data table 1100 of FIG. 11, the list of wireless networks commonly nearby the media device 112) and/or other data associated with the panelist (e.g., the demographic data of the example data table 300 of FIG. 3, the example panel participation data table 400 of FIG. 4, etc.) to identify a panelist matching the panel opportunity data (block 930). In examples disclosed herein, the panelist(s) are identified by performing a structured query language query against the fingerprint database 170 and/or the panelist database 160. However, any other approach to identifying panelists matching parameters defined in the panel opportunity data may additionally or alternatively be used. As an example, if the panel opportunity data indicated that Android™ users that commonly are nearby iOS devices should be requested to join the iOS panel, panelist "B" may be identified, because panelist "B" (see row 1160 of FIG. 11) primarily uses an Android™ device and is commonly connected to a same local area network as an Apple Apple™ device. However, any other parameters and/or demographic requirement(s) may additionally or alternatively be used to identify panelists such as, for example, the age of the panelist, the gender of the panelist, the race of the panelist, the marital status of the panelist, the income of the panelist and/or the household of the panelist, the employment status of the panelist, where the panelist typically uses the media device 112, how long the panelist has owned the media device 112, the education level of the panelist, whether the panelist complies with instructions from the audience measurement entity for operating the media monitor 130, wireless networks commonly nearby the media device of the panelist, etc.

The example panel opportunity identifier 180 transmits a message to the identified panelist(s) (e.g., an email message, a short message service (SMS) message, etc.) (block 940). In examples disclosed herein, the message may be message requesting the panelist to register for participation in another panel (e.g., a panel associated with a device and/or device type included in the fingerprint) (e.g., "Are you and/or a family member interested in joining the Android™ panel?"). In examples disclosed herein, when joining and/or registering for another panel, the panelist does not provide additional demographic information, as such information was collected during a prior panel enrollment. However, in some examples, the panelist may be requested by the registrar 155 to confirm their demographic information. In some examples, the message may be a survey concerning the other devices and/or wireless networks commonly nearby the media device 112. In some examples, the message is displayed by the recruitment controller 260 of the fingerprint generator 115. In some examples, the message instructs the panelist to visit a webpage (e.g., a webpage identified by a URL) of the registrar 155 to enroll in an additional panel(s).

While in some examples disclosed herein, the fingerprint(s) are analyzed to identify panel opportunities (e.g., opportunities for enrolling additional panelists), in some examples, the fingerprint(s) are analyzed to identify inconsistencies in a panelist's reported demographic data. For example, a panelist that is identified as single (e.g., living alone), but having an associated fingerprint that identifies many other devices are seen during evenings and overnight, might suggest that the panelist lives with roommates and/or a family. In such an example, the panelist may be requested to confirm their demographic information.

Figure 12:
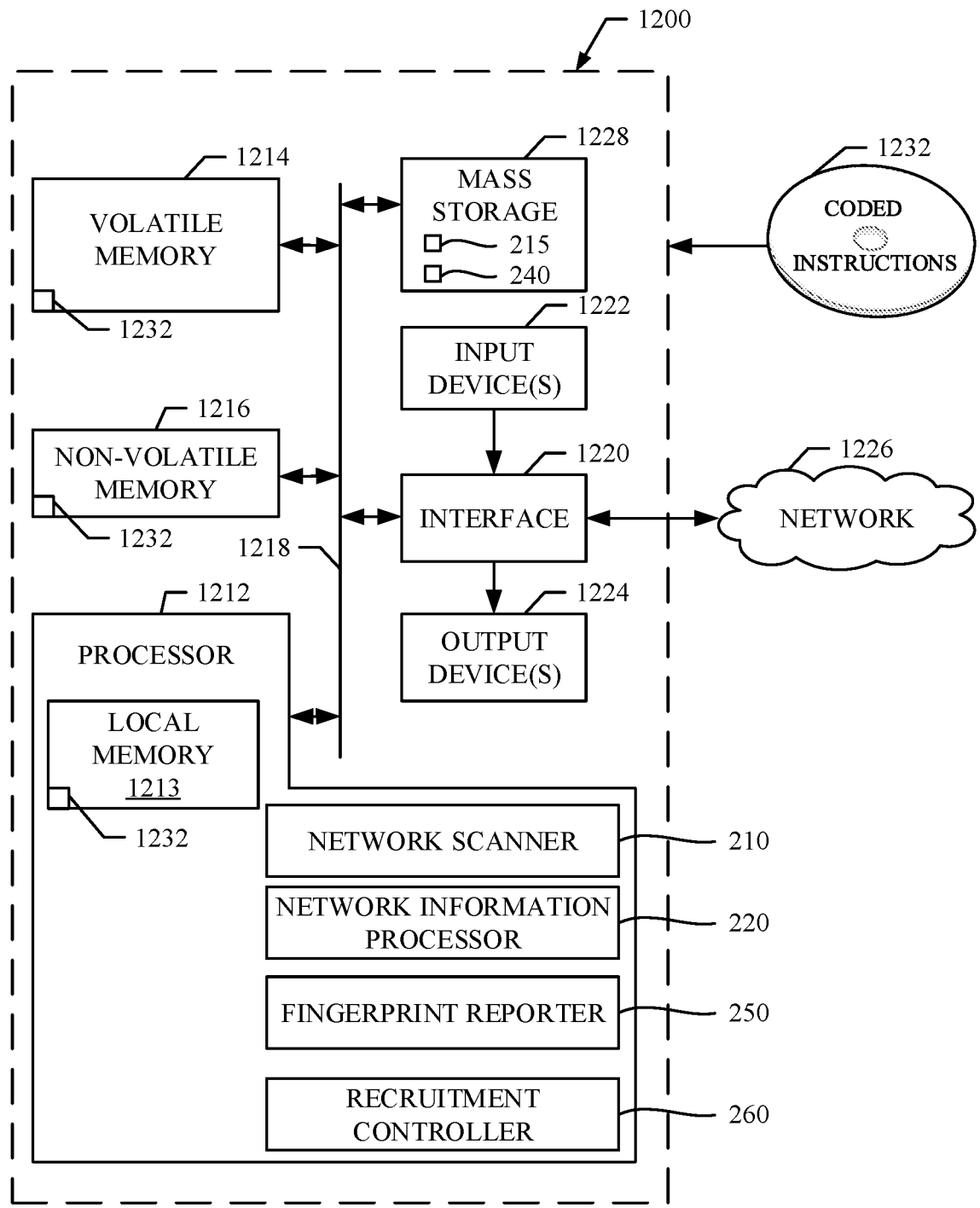
FIG. 12 is a block diagram of an example processor platform capable of executing the example machine-readable instructions of FIGS. 5, 6, and/or 7 to implement the example fingerprint generator of FIGS. 1 and/or 2.

FIG. 12 is a block diagram of an example processor platform 1200 capable of executing the example machine-readable instructions of FIGS. 5, 6, and/or 7 to implement the example fingerprint generator 115 of FIGS. 1 and/or 2. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache) and executes instructions to implement the example network scanner 210, the example network information processor 220, the example fingerprint reporter 250, and/or the example recruitment controller 260. In some examples, the processor 1212 executes instructions to implement the media monitor 130. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives. In the illustrated example of FIG. 12, the example mass storage 1228 implements the example temporary network information data store 215 and the example fingerprint data store 240.

The coded instructions 1232 of FIGS. 5, 6, and/or 7 may be stored in the mass storage device 1228, in the volatile memory 1214, in the non-volatile memory 1216, and/or on a removable tangible computer readable storage medium such as a CD or DVD.

Figure 13:
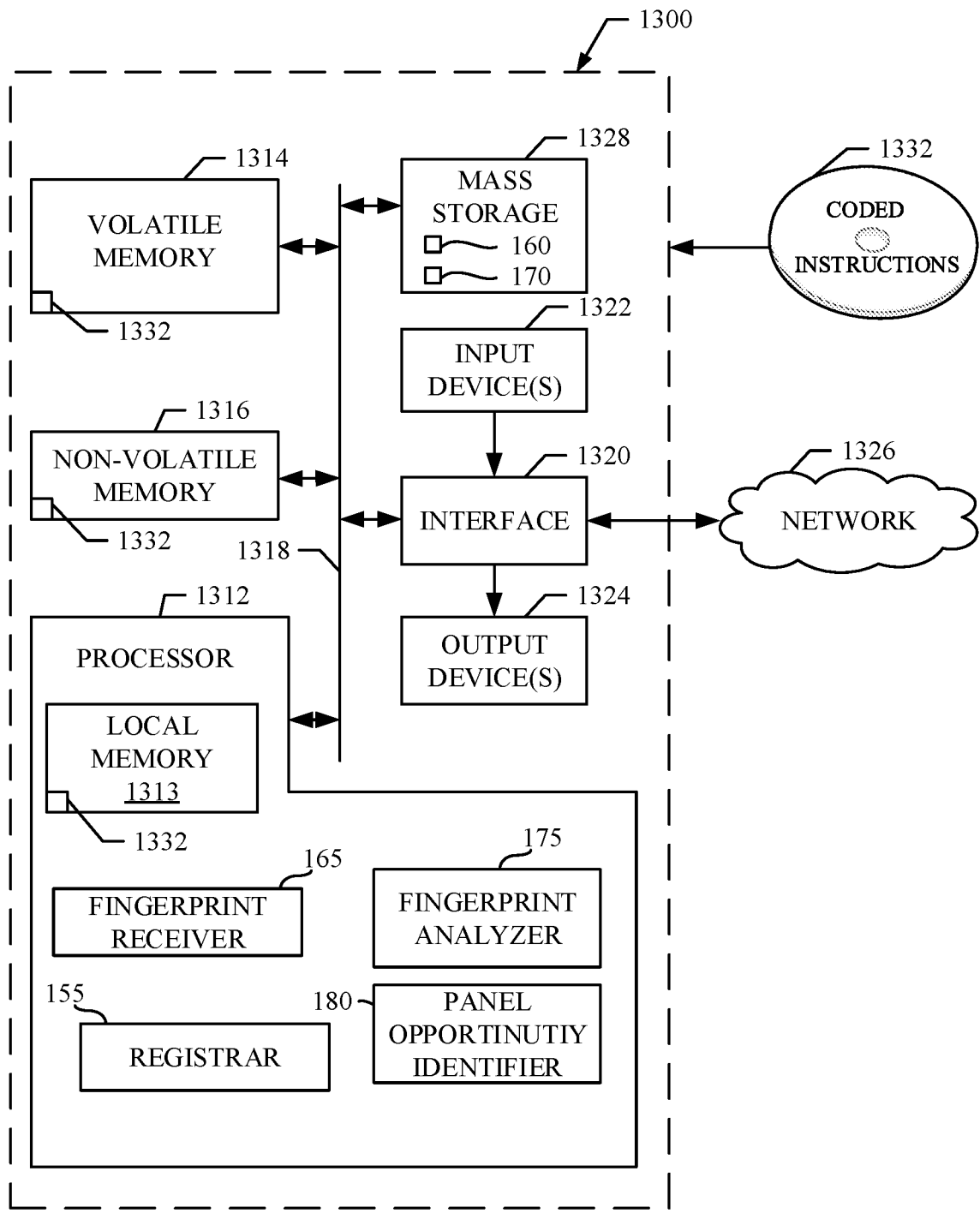
FIG. 13 is a block diagram of an example processor platform capable of executing the example machine-readable instructions of FIGS. 9 and/or 10 to implement the example central facility of FIG. 1.

FIG. 13 is a block diagram of an example processor platform capable of executing the example machine-readable instructions of FIGS. 9 and/or 10 to implement the example central facility 110 of FIG. 1. The processor platform 1300 can be, for example, a server, a personal computer, an Internet appliance, or any other type of computing device.

The processor platform 1300 of the illustrated example includes a processor 1312. The processor 1212 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache) and executes instructions to implement the example registrar 155, the example fingerprint receiver 165, the example fingerprint analyzer 175, and/or the example panel opportunity identifier 180. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. In the illustrated example of FIG. 13, the example mass storage 1328 implements the example panelist database 160 and the example fingerprint database 170.

The coded instructions 1332 of FIGS. 9 and/or 10 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods, apparatus and articles of manufacture enable panelists to be recruited for participation in panels that are specific to the type(s) of device that they frequently use (e.g., an Apple iPhone™, a desktop computer, a Google Android™ tablet, etc.). By generating a fingerprint including information identifying devices that are commonly connected to a same local area network as a media device operated by a panelist, opportunities to recruit existing panelists for participation in additional panels can be easily identified. Moreover, because generation of such fingerprint is performed by a fingerprint generator at the media device of the panelist, changes in the devices that are commonly connected to the same local area network as the media device can be detected, and such changes can be acted upon. For example, whereas in prior systems all panelists might be requested to join additional panels periodically (e.g., every month, every quarter year, etc.), in examples disclosed herein, targeted panelists can be prompted to join an additional panel soon after acquisition of a new device. Proactively prompting a panelist to join an additional panel enables a more holistic measurement to be made of the media presented to the panelist (e.g., as no or few media devices are omitted from the monitoring effort). In addition to panel recruitment messages, example approaches disclosed herein enable other messages (e.g., surveys, questionnaires, etc.) to be presented to panelists based on devices and/or wireless networks that the media device is commonly near.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for expanding panelist enrollment, the apparatus comprising:
   a network interface to access monitoring data from a media device, the monitoring data to identify media that was presented at least one of by the media device or within a physical proximity of the media device;
   a registrar to receive registration information from a panelist, the registration information including demographic information associated with the panelist and information about the media device associated with the panelist;
   a panelist database to store the demographic information associated with the panelist, the panelist database to store a record associating an enrollment of the panelist in a first panel corresponding to a first category of the media device;
   a fingerprint receiver to access a fingerprint received from the media device associated with the panelist, the fingerprint identifying devices communicating on a same local area network as the media device, the same local area network identified based on a subnet that a private Internet protocol address of the media device is part of to reduce a search space of potential devices;
   a fingerprint analyzer to determine whether a second device within a second category of devices corresponding to a second panel is identified in the fingerprint, the second category of devices not including the media device; and
   a panel opportunity identifier to determine that the panelist meets a demographic requirement for participation in the second panel, the panel opportunity identifier to prompt the panelist to join the second panel in response to the determination that the second device within the second category of devices is identified in the fingerprint and that the panelist meets a demographic requirement for participation in the second panel, the prompting of the panelist to be performed without requesting additional demographic information from the panelist.

2. The apparatus of claim 1, wherein the fingerprint identifies wireless local area networks within a wireless signal communication range of the media device.

3. The apparatus of claim 1, wherein the panel opportunity identifier is to prompt the panelist to join the second panel in response to a determination that the panelist is not enrolled in the second panel.

4. The apparatus of claim 1, wherein the registrar is to register the panelist for the second panel, wherein the panelist does not provide demographic information when joining the second panel.

5. The apparatus of claim 1, wherein the fingerprint analyzer is to evaluate a pattern representative of a device identifier associated with one or more devices in the second category of devices to determine whether the second device within the second category of devices corresponding to the second panel is identified in the fingerprint.

6. The apparatus of claim 1, wherein the first panel corresponds to devices operating a first operating system and the second panel corresponds to devices operating a second operating system different from the first operating system.

7. The apparatus of claim 1, wherein the panel opportunity identifier is to prompt the panelist to join the second panel by transmitting a message to the media device.

8. A method to expand panelist enrollment, the method comprising:
   accessing registration information from a panelist, the registration information including demographic information associated with the panelist and information about a media device associated with the panelist;
   storing the demographic information associated with the panelist and a record associating an enrollment of the panelist in a first panel corresponding to a first category of the media device;
   accessing a fingerprint received from the media device associated with the panelist, the fingerprint identifying devices communicating on a same local area network as the media device, the same local area network identified based on a subnet that a private Internet protocol address of the media device is part of to reduce a search space of potential devices;
   parsing, by executing an instruction with a processor, the fingerprint to determine whether a second device within a second category of devices corresponding to a second panel is identified in the fingerprint, the second category of devices not including the media device;
   determining that the panelist meets a demographic requirement for participation in the second panel without requesting additional demographic information from the panelist; and
   in response to the determination that the second device within the second category of devices is identified in the fingerprint and that the panelist meets the demographic requirement for participation in the second panel, prompting the panelist to join the second panel, the prompting of the panelist to be performed without requesting additional demographic information from the panelist.

9. The method of claim 8, wherein the fingerprint identifies wireless local area networks nearby the media device.

10. The method of claim 8, wherein the prompting of the panelist to join the second panel occurs in response to a determination that the panelist is not enrolled in the second panel.

11. The method of claim 8, wherein the panelist does not provide demographic information when joining the second panel.

12. The method of claim 8, wherein the parsing of the fingerprint includes evaluating a pattern representative of a device identifier associated with one or more devices in the second category of devices.

13. The method of claim 8, wherein the first panel corresponds to devices operating a first operating system and the second panel corresponds to devices operating a second operating system different from the first operating system.

14. The method of claim 8, wherein the prompting of the panelist to join the second panel includes transmitting a message to the media device.

15. A non-transitory machine-readable medium comprising instructions which, when executed, cause a machine to at least:
- access registration information from a panelist, the registration information including demographic information associated with the panelist and information about a media device associated with the panelist;
- store the demographic information associated with the panelist and a record associating an enrollment of the panelist in a first panel corresponding to a first category of the media device;
- access a fingerprint received from the media device associated with the panelist, the fingerprint identifying devices communicating on a same local area network as the media device, the same local area network identified based on a subnet that a private Internet protocol address of the media device is part of to reduce a search space of potential devices;
- parse the fingerprint to determine whether a second device within a second category of devices corresponding to a second panel is identified in the fingerprint, the second category of devices not including the media device;
- determine that the panelist meets a demographic requirement for participation in the second panel without requesting additional demographic information from the panelist; and
- in response to the determination that the second device within the second category of devices is identified in the fingerprint and that the panelist meets a demographic requirement for participation in the second panel, prompt the panelist to join the second panel, the prompting of the panelist to be performed without requesting additional demographic information from the panelist.

16. The non-transitory machine-readable medium of claim 15, wherein the prompting of the panelist to join the second panel occurs in response to a determination that the panelist is not enrolled in the second panel.

17. The non-transitory machine-readable medium of claim 15, further including instructions which, when executed, cause the machine to evaluate a pattern representative of a device identifier associated with one or more devices in the second category of devices.

\* \* \* \* \*